Patented Apr. 28, 1942

2,281,225

UNITED STATES PATENT OFFICE 2,281,225

METHOD OF PRODUCING MOLDS

Purling A. Bleakley, Toledo, Ohio, assignor to The Bleakley Corporation, Toledo, Ohio, a corporation of Delaware No Drawing. Application February 15, 1940, Serial No. 319,014

8 Claims. (Cl. 148—3)

This invention relates to improvements in process of making molds and relates particularly to the production of molds for shaping materials such as resins, plastics, metals and the like into various articles of manufacture.

This is a continuation-in-part of my application Serial No. 177,948, filed December 3, 1937.

Molds of the type that have been used heretofore for molding materials of the type mentioned above are usually formed by machining solid blocks of material into the desired shape and dimensions. Inasmuch as such molds must be formed with a considerable degree of accuracy and must be provided with smooth and well finished molding surfaces, the production of such molds either singly or in quantities is expensive and time-consuming.

It has also been suggested that molds or matrices might be made by spraying molten metal on a form, such as, for example, a tire casing. This type of spraying operation is carried out at low temperature and results in the formation of a fragile, laminated and highly porous structure which is not suitable for use in the production of articles having polished surfaces. Moreover, such porous and laminated matrices cannot be machined because of their tendency to peel and crack.

An object of the present invention is to overcome the disadvantages encountered in the production of molds of the type described above by providing a simple, inexpensive and extremely rapid method of producing molds for polished objects without expensive and time-consuming machining operations.

Another object of the invention is to provide methods of making molds having molding surfaces which need not be machined and outer surfaces which may be easily machined to permit them to be fitted into the molding machines in which they are used.

Another object of the invention is to provide a method of making molds which have smooth non-porous molding surfaces and require little, if any, treatment to fit them for use in molding smooth surfaced articles.

Other objects of the invention will become apparent from a description of a typical form of process embodying the invention.

The invention in its broadest aspects comprises the spraying of the metal from which the mold is to be produced upon a fluid-cooled mandrel whereby the successive layers of metal applied by the spray weld together and form a finely grained metallic structure.

According to my method, metal is sprayed under such conditions that a mold body is produced which has a smooth molding surface and a metallic structure characterized by relatively low porosity and such fine grain that the material may be readily machined without danger of cracking or shattering.

The size of grain and the porosity of the elements are further decreased by an annealing treatment which causes the metal to be compacted so that it corresponds closely to the metallic structure and density of the material from which the mold is made prior to melting and spraying.

A "spray gun," such as is disclosed in my Patent No. 2,092,150, dated September 7, 1937, may be used in practicing the method. In this gun, a metal wire is passed through the nozzle, melted and blown in the form of a fine spray surrounded by a substantially non-oxidizing or oxygen-free sheath or stream of burning gas. Other forms of guns may be used in practicing the process, but the metal must be sprayed in a molten and highly heated condition as contrasted with the cool or cold metal spray mentioned above.

Many different types of metals may be sprayed readily by means of guns of the type described above to form molds. For example, I may use such metals as chrome nickel steel, cold rolled steel and other steels now commonly used in the production of dies and molds. The finished molds will have characteristics similar to these metals in the wire or rod form inasmuch as they take an extremely high polish and are comparatively dense. Likewise, molds have been made successfully from non-ferrous metals, such as brass or bronze, and even such metals as aluminum and aluminum alloys by my process. Moreover, it is possible to produce molds by spraying molten glass upon the mandrel and thus provide a very highly polished mold surface and a mold of little or no porosity.

The mandrel upon which the molten material is sprayed preferably is provided with a design and dimensions corresponding to the shape of the mold cavity that is to be produced. That area of the mandrel which is to determine the design and contour of the cavity is then slightly roughened as by means of etching or sand-blasting. The roughening should not be appreciable as otherwise the molding surface of the mold will be pitted and roughened, thereby making it necessary to polish or machine the molding surface. For example, the roughening should not exceed that produced by the use of sand of a particle size of about 40 mesh. The reason for roughening or etching the mandrel is to prevent the skidding or sliding of the metal particles as they are sprayed upon the mandrel. Skidding of the particles is further reduced by moving the surface upon which the spray impinges substantially at right angles to the axis of the spray of metal. Thus the mandrel may be rotated if a circular mold is being produced and may be reciprocated or oscillated if an oblong mold is desired.

The mandrel is artificially cooled to a desired extent, for example, by the circulation of cool water through its interior. The water extracts the heat from the mandrel and from the interior surface of the mold that is being built up on the mandrel. The rapid cooling of the metal in contact with the mandrel hardens it and renders it extremely dense, thereby producing a surface which is smooth initially and may be used without further polishing or machining. If desired, the surface of the finished mold may be given a very high polish by simple polishing operations.

As the metal is built up on the mandrel by continuing the spraying operation, a comparatively uniform interior and exterior cooling is obtained which results in the formation of a metal which does not reach an extreme in density or hardness and may be readily machined. Thus, a metallic mold has a structure similar to a very fine grain casting which has what is known as an "0" grain and has a comparatively high porosity as compared with the original wire or rod. Moreover, the uniform cooling fixes the grain structure of the metal and provides a control for regulating the hardness of the metal of the finished mold.

It has been observed that when the mandrel is not cooled the applied metal remains extremely hot, entraps the heat and gas and subjects itself to a form of self-hardening which prevents successful machining or otherwise treating the mold.

The porosity of the mold may be decreased and its density increased by the following treatment. After the mold has been sprayed upon the mandrel it is removed and placed in a hydrogen furnace or oven which is substantially free from oxygen and raised in temperature to the critical temperature of the particular metal or slightly above, but less than the fusion temperature of the material from which the mold is made. This temperature is held for a sufficient length of time to obtain desired rearrangement or change in the metallic structure. The molds are then cooled slowly down to room temperature. By heating the molds in a non-oxidizing gas the carbon gases are exhausted from the metal and the grain structure is compacted so that the final product has a grain structure similar to that which existed in the material from which the molds are made.

In operation the projecting gun is positioned at a predetermined distance from the mandrel, depending upon the texture or grain structure that is to be produced. If, for example, the gun is placed very close to the mandrel, the metal is deposited at a high temperature and at great velocity. The impact of the spray under these conditions will cause it to be compacted about the mandrel and will render the deposited material comparatively dense and non-porous. If the gun is adjusted or moved to a greater distance from the mandrel, the resulting mold structure becomes more porous because of the decrease in the temperature of the metal and the lowered impact velocity of the sprayed material.

The grain structure of the mold can, moreover, be varied by varying the size of the spray gun nozzle. Thus, for example, a spray gun nozzle one-half inch in diameter produces a more dense mold structure than does a spray gun nozzle which is nine-sixteenths of an inch in diameter. It appears that the material is more finely comminuted by its passage through the smaller nozzle and thus the smaller particles bond more closely together and decrease the porosity of the material.

While the molds may be made from but one metal or from a single alloy, it is within the scope of the present invention to form the molds of a plurality of different metals, if so desired. Thus, the interior of a mold can be formed of such hard metal as "Stellite" and the outer portion of the mold which is to be machined can be formed of a softer and more readily machined material. It will be understood that suitable fluxes will be used to cause bonding of the two metals together at their interfaces. Such a composite mold may be readily produced by using two or more spray guns so that the operation of one can be discontinued and the other begun without dissipation of the non-oxidizing gas blanket surrounding sprays and the mold. Thus, oxidation of metals is avoided and any tendency of the metals to fail to bond together due to an oxidation of their surfaces is avoided.

It will be understood that different metals may well require different spraying conditions, but in any event the metal should be delivered to the mandrel in a molten rather than in a vaporized condition. Likewise annealing temperatures and times may be varied. However, during annealing, the mold should be heated gradually to or slightly above the critical temperature of the mold material, but well below the melting point of the material.

Inasmuch as this method is susceptible to considerable variation without departing from the invention, it should be understood that such variations may be resorted to within the scope and spirit of the following claims.

I claim:

1. The method of producing a metallic article which consists in projecting a stream of molten metal in pulverulent form through a non-oxidizing zone onto a mandrel, artificially cooling the mandrel during projection of the metal thereon, effecting a relative movement between the mandrel and stream of projected metal in an angular direction with respect to the axis of the stream of metal during projection thereof, removing the article from the mandrel and annealing the article by heating to its critical point in a substantially oxygen-free chamber and then cooling it slowly.

2. The method of producing an article which consists in projecting a stream of molten metal in pulverulent form onto a mandrel, applying a cooling liquid to the interior of the mandrel to freeze the material, moving the mandrel during projection of the material to build up an article on said mandrel, removing the article from the mandrel and annealing the article.

3. The method of producing a metallic article which consists in projecting a stream of molten metal in pulverulent form through a substantially oxygen-free zone onto a form, artificially cooling the form during projection of metal thereon, removing the article from the form and annealing the article by heating to its critical point in a substantially oxygen-free chamber and then cooling it slowly.

4. The method of producing a mold having a cavity therein which consists in shaping a mandrel or form having a surface corresponding in dimensions and contour to those of a desired mold cavity, roughening the surface of the mandrel, projecting a stream of molten metal in pulverulent form through a substantially oxygen-free zone onto said surface, artificially cooling the mandrel during the projection of metal thereon, removing the mold from the mandrel and annealing the mold by heating to its critical point in a substantially oxygen-free chamber and then cooling it slowly.

5. The method of producing a metal mold having a cavity which consists in spraying molten metal through a substantially oxygen-free zone onto a form, artificially cooling the form, moving the form at an angle to the axis of the spray travel during the spraying operation, removing the mold from the form and removing the gases from the metal and compacting the grain structure of the metal by placing the mold in a substantially oxygen-free annealing oven, raising the temperature in the oven to the critical point of the metal and maintaining it a predetermined period of time and slowly cooling the mold.

6. The method of producing a metal article which consists in projecting a stream of molten metal in pulverulent form onto a mandrel, enclosing the projected stream of metal and at least a portion of the mandrel in a gaseous blanket substantially free from oxygen, artificially cooling the mandrel, moving the mandrel at an angle to the axis of the stream during projection of the latter and annealing the article in a substantially oxygen free chamber by heating the article to its critical point and then gradually cooling it.

7. The method of producing a metal article which consists in projecting a stream of molten metal in pulverulent form through a zone rendered substantially oxygen free by a blanket of burning gas onto a mandrel, artificially cooling the mandrel, moving the surface to which the metal is being applied at an angle to the axis of the stream during projection thereof, maintaining said surface substantially within one end of the oxygen free zone during projection of metal thereon and annealing the article by raising its temperature to its critical point in a substantially oxygen free chamber and then slowly cooling the article.

8. A method of producing a metal article which comprises spraying a stream of molten metal in comminuted form and at a temperature above the melting point of said metal onto and causing it to adhere to a form cooled by a liquid at substantially the temperature of water, and moving said stream and said form relatively to cause said metal to impinge upon different portions of said form to produce a shell of metal having a surface conforming to the shape and size of said form.

PURLING A. BLEAKLEY.